No. 889,458. PATENTED JUNE 2, 1908.
R. GOOD.
APRICOT CUTTER.
APPLICATION FILED JULY 24, 1905.
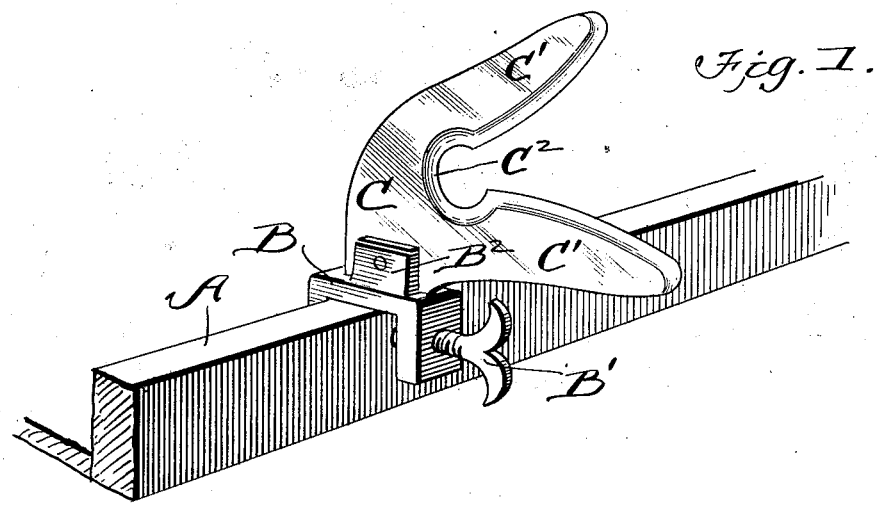
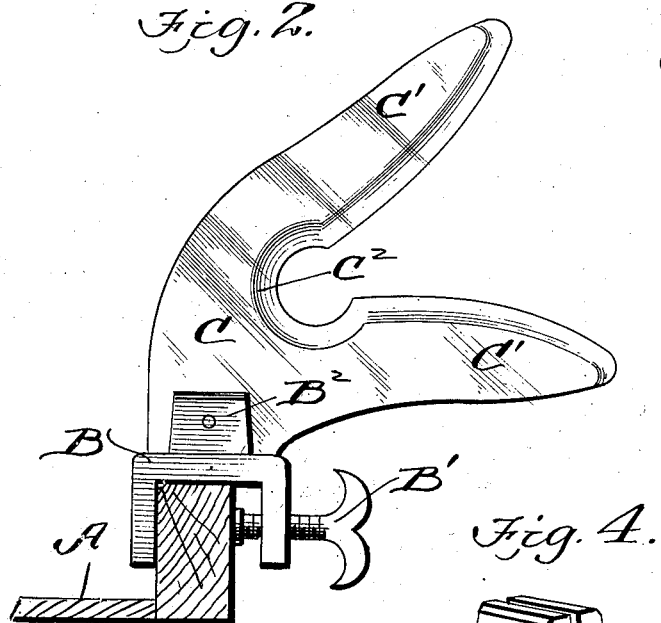
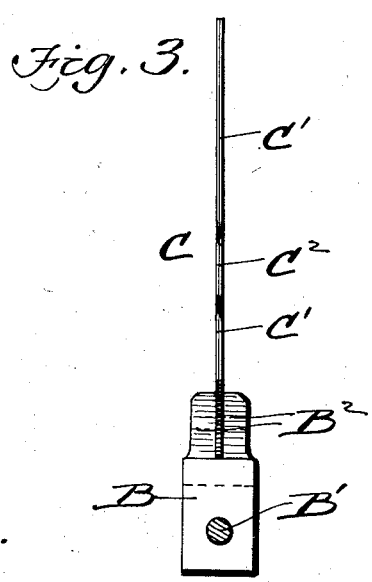
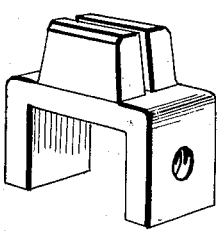
WITNESSES:
INVENTOR
R. Good.
BY
ATTORNEYS

UNITED STATES PATENT OFFICE.

ROBERT GOOD, OF EDEN VALE, CALIFORNIA, ASSIGNOR OF ONE-HALF TO JOHN JONES, OF EDEN VALE, CALIFORNIA.

APRICOT-CUTTER.

No. 889,458.      Specification of Letters Patent.      Patented June 2, 1908.

Application filed July 24, 1905. Serial No. 271,065.

*To all whom it may concern:*

Be it known that I, ROBERT GOOD, a citizen of the United States, residing at Eden Vale, in the county of Santa Clara and State of California, have invented a new and useful Improvement in an Apricot-Cutter, of which the following is a specification.

This invention relates to fruit cutters and especially to cutters designed for halving apricots, and is also designed to be readily attached or removed from the edge of a tray.

The invention consists of two forwardly extending blades in vertical alinement and diverging from each other, the blades being joined by circular marginal portions whereby an opening is formed at the base of the blades, through which the pit or stone from the fruit can fall thus preventing its catching or clogging between the blades.

The invention also consists of the novel features of construction herein described, pointed out in the claims and shown in the accompanying drawings, in which, Figure 1 is a perspective view of the device attached to the edge of the tray. Fig. 2 is a vertical side elevation of my cutter. Fig. 3 is a front edge view of the cutter. Fig. 4 is a detail perspective view of the clamping member, to which the cutter is attached.

In these drawings, A represents a tray, to which is secured a clamp B, by means of a set screw B', the clamp and set screw being of the usual form of construction. The clamp B, carries upwardly extending lugs B², between which are riveted or otherwise secured, a thin steel plate, C, projecting forwardly in advance of the tray. This plate is bifurcated forming two cutting blades C', in vertical alinement, the lower blade projecting forwardly and in substantially a horizontal plane and the upper blade projecting forwardly and upwardly. Adjacent their point of juncture, the cutting edges of the blade C', are connected by a circular edge C² whereby the space between the inner end portions of the blades is slightly enlarged as clearly shown in Figs. 1 and 2.

The clamping member may be very readily attached to the tray and as readily removed to another tray.

In use the apricot is pressed between the blades C', the upper blade cutting into the apricot to the pit and the lower blade coacting therewith and cutting upon the opposite side. One-half of the fruit is thus left in each hand of the operator and the stone drops therefrom into any suitable receptacle arranged in advance of the tray. This device can be used upon fruit of any size as it will be obvious that in cutting there is first an inward and downward motion as the fruit is passed between the blades and an outer motion, as it is drawn back, and during the first motion, the upper blade will cut to the pit, and as the fruit is drawn out, it is pressed against the lower blade, which also cuts to the pit.

By reason of the enlargement, due to the circular edge C², the pit will always fall clear of the blades, and by reason of the blades projecting in advance of the tray, the pit will also fall clear of the tray.

The operation of cutting, is therefore, always much simplified, as it is simply necessary to pass the fruit into and out of engagement with the blades and then drop the two halves into the tray A, thus avoiding the second handling of the fruit.

Having thus fully described my invention, what I claim as new and desire to secure by Letters Patent, is:—

A device of the kind described comprising a clamp, parallel lugs carried by the clamp, and a bifurcated plate fixed between the said lugs, and having two fixed, diverging and forwardly extending cutting blades.

ROBERT GOOD.

Witnesses:
   JOHN N. MARTIN,
   WM. COBB.